(12) United States Patent
Lambie

(10) Patent No.: US 9,164,592 B2
(45) Date of Patent: Oct. 20, 2015

(54) KEYPAD

(75) Inventor: John Lambie, Toowong (AU)

(73) Assignee: Ideatron Pty Ltd, Toowong, Queensland (AU)

( * ) Notice: Subject to any disclaimer, the term of this patent is extended or adjusted under 35 U.S.C. 154(b) by 130 days.

(21) Appl. No.: 13/983,613

(22) PCT Filed: Feb. 10, 2012

(86) PCT No.: PCT/AU2012/000134
§ 371 (c)(1),
(2), (4) Date: Aug. 5, 2013

(87) PCT Pub. No.: WO2012/106776
PCT Pub. Date: Aug. 16, 2012

(65) Prior Publication Data
US 2013/0321281 A1    Dec. 5, 2013

(30) Foreign Application Priority Data

Feb. 11, 2011  (AU) .................... 2011900452

(51) Int. Cl.
*G06F 3/02* (2006.01)
*G06F 3/023* (2006.01)
*G06F 3/0488* (2013.01)

(52) U.S. Cl.
CPC ............ *G06F 3/0233* (2013.01); *G06F 3/0219* (2013.01); *G06F 3/04886* (2013.01)

(58) Field of Classification Search
CPC .................... G06F 3/0219; B41J 5/10
USPC .............. 345/169; 400/486; 341/23
See application file for complete search history.

(56) References Cited

U.S. PATENT DOCUMENTS

| | | | | | |
|---|---|---|---|---|---|
| 3,698,533 | A | * | 10/1972 | Illig et al. | 400/486 |
| 4,180,337 | A | * | 12/1979 | Otey et al. | 400/486 |
| 4,927,279 | A | * | 5/1990 | Morgan | 400/486 |
| 5,073,054 | A | * | 12/1991 | McDowell | 400/486 |
| 5,452,240 | A | * | 9/1995 | Roca et al. | 708/110 |
| 5,584,588 | A | * | 12/1996 | Harbaugh | 400/486 |
| 6,084,576 | A | * | 7/2000 | Leu et al. | 345/168 |
| 6,142,687 | A | * | 11/2000 | Lisak | 400/472 |
| 7,008,127 | B1 | * | 3/2006 | Kurriss | 400/486 |
| 2003/0038735 | A1 | * | 2/2003 | Blumberg | 341/22 |
| 2005/0008418 | A1 | * | 1/2005 | Green | 400/486 |
| 2005/0244208 | A1 | * | 11/2005 | Suess | 400/486 |
| 2006/0228149 | A1 | * | 10/2006 | Harley | 400/486 |
| 2008/0304892 | A1 | * | 12/2008 | Baker | 400/486 |
| 2012/0114406 | A1 | * | 5/2012 | Cenky | 400/486 |
| 2012/0176320 | A1 | * | 7/2012 | Burrell, IV | 345/168 |

* cited by examiner

*Primary Examiner* — Dorothy Harris

(74) *Attorney, Agent, or Firm* — Stephen T. Scherrer; Monique A. Morneault; Scherrer Patent & Trademark Law, P.C.

(57) ABSTRACT

The invention provides a keypad comprising at least consonant keys and vowel keys such that the vowel keys are arranged in a column between two edge columns of consonant keys, or in a row between two edge rows of consonant keys, wherein the consonant keys other than Z follow an alphabetic progression.

18 Claims, 16 Drawing Sheets

KEYPAD

FIELD OF THE INVENTION

The present invention relates to the field of information technology. More particularly, the invention relates to a keypad that is optimised for modern computing devices. The keypad finds particular application in compact computing devices using touchscreen technology such as smart phones, tablets and surface devices, as well as laptops and desktops, and remote or cabled keypad devices.

BACKGROUND TO THE INVENTION

The most common key layout for a computer keyboard is known as the QWERTY keyboard, so named because the first six letters are q, w, e, r, t and y. The keyboard was originally designed for use with mechanical typewriters that used downwards force on keys to actuate pivoted typeset to impact against an inked ribbon. The QWERTY keyboard was specifically designed to reduce the speed of a typist because the typewriters suffered from jamming when typists struck keys in quick succession on more intuitive keyboard layouts, such as those with an alphabetic layout.

Clearly such a mechanical limitation is not a problem with electric typewriters, word-processors or computer keyboards, yet the QWERTY key layout has persisted in these devices. The persistence is even more remarkable for compact devices, such as smart phones and tablet devices, on which users type with a single finger, one or two thumbs or one-handed. This is true of both physical keyboards and virtual keypads (generated on a touchscreen using software).

The problem applies also to other character sets, such as keypads using other Roman-based alphabets (Spanish, French, Indonesian, etc.), non-Roman alphabets (Greek, Cyrillic, Korean, That, etc.), or character based scripts such as Japanese and Chinese.

Objects of the Invention

It is an object of the present invention to overcome or at least alleviate one or more of the above limitations by providing a more intuitive keypad.

SUMMARY OF THE INVENTION

In one form, although it need not be the only or indeed the broadest form, the invention resides in a keypad comprising at least consonant keys and vowel keys such that the vowel keys are arranged in a column between two edge columns of consonant keys, or in a row between two edge rows of consonant keys, wherein the consonant keys other than Z follow an alphabetic progression.

The columns or rows can be curved to map the rotation of the thumb joint and in one preferred arrangement there is split-keypad with a space between a right side block of keys and a left side block of keys. The space can optionally include a screen. The columns can also rotate away from the vertical or the rows away from horizontal, to accommodate different typing positions.

In a further form, the invention resides in a keypad in which the keys are arranged beneath a "strike zone" of input keys so that most commonly accessed keys are most easily reached. Most suitably, the keys are arranged in a right side block of curved columns or rows beneath a strike zone of a right thumb of a user and a left side block of curved columns or rows beneath a strike zone of a left thumb of a user.

Preferably additional function, toggle or punctuation keys (symbol keys) are arranged around the alphabetic keys, such as one or more space bars/keys, a capitalisation toggle key, a number pad toggle key and an enter key. For example, the rows or columns of consonant keys can include one or more symbol keys, or the rows or columns of vowel keys can include one or more symbol keys.

The consonant and vowel keys can also be interchangeable with mathematical symbol (for example +, −, =) and/or numerical keys.

The alphabetic progression of the keys can be from left to right, right to left, top to bottom, or bottom to top of the keypad.

Preferably the keys of the keypad are arranged in a 6×5 grid of keys: 6 keys across and 5 down, or 5 keys across and 6 down.

The keys of the keypad can be flush with the keypad, raised above the surface of the keypad, or indented into the keypad.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Figure 1:
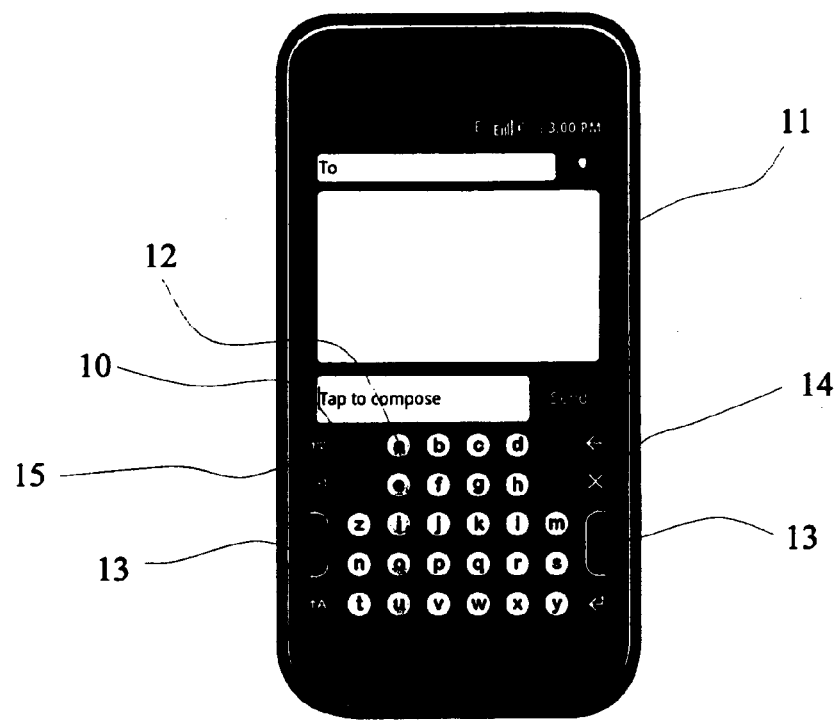
FIG. 1 shows a preferred keypad layout.

Embodiments of the present invention reside primarily in a physical or virtual keypad. Accordingly, elements of the invention have been illustrated in concise schematic form in the drawings, showing only those specific details that are necessary for understanding the embodiments of the present invention, but so as not to obscure the disclosure with excessive detail that will be readily apparent to those of ordinary skill in the art, having the benefit of the present description.

In this specification, adjectives such as first and second, left and right, and the like may be used solely to distinguish one element or action from another element or action, without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Referring to FIG. 1 there is shown a layout of keys in a keypad 10 that forms part of a smart phone 11, such as an Apple iPhone® or Samsung Galaxy®. The particular keypad shown is a virtual keypad (generated by software) but could also be a physical keypad such as provided on other smart phones, such as the Palm Treō® or Blackberry®.

The keypad has a number of significant features that make it easy for thumb or single-finger typing. The keys are circular (as opposed to square, oblong or rectangular) to better match the size and shape a human fingerprint makes when lightly contacting the screen. Each key is separated from adjacent keys by a large buffer zone to reduce the chance of a mis-hit and thus striking the wrong key. This also means that adjacent key pairs (a & b, a & d and a & f for instance) can be typed by dragging a fingertip across the touchscreen's surface from one key to the next rather than two discreet and sequential fingertips on two distinct keys.

The letters are laid out in columns and rows in substantially alphabetic sequence, except for one letter, 'z' which is relocated. All the vowels are formed into one column 12 and coloured distinctly for easy identification. The other letters are also formed into columns on a symmetric pattern. There are four columns of five keys and two columns of three keys. The two columns of three keys are set with one column either side of the block of four columns. The keys are round or oval to minimise overlap of the thumb or finger onto adjacent keys.

The keys are arranged in alphabetic sequence reading left to right and down the keypad, except for z which is relocated to achieve the symmetric arrangement. Two space bars 13 are provided at the left and right edges of the screen, adjacent to the letters block. Editing keys (cursor left, delete/backspace, enter, etc) are preferably positioned on the right margin 14.

Keypad toggle keys that display a different character set, such as capital letters, numbers & math symbols and punctuation, are preferably positioned on the left margin 15. It will be appreciated that the position of the non-alphabetic keys is not limited to the arrangement of FIG. 1. Nonetheless, the inventor has found that the particular arrangement shown is convenient.

Figure 2:
FIG. 2 shows the keypad layout of FIG. 1 indicating strike zones.

As shown in FIG. 2, the most commonly used keys are located in strike zones 20 that are most easily accessible by a digit of a user. In the particular arrangement of FIG. 1 and FIG. 2, the strike zones relate to the thumbs of the user. The left strike zone covers the letters a, e, z, i, n, o, t and u and the right strike zone covers the letters d, h, l, m, r, s, x and y. The letters a, e, i, n, o, t, d, h, l, r, s and c are found in 80% of English words.

The invention is not limited to a keypad useful for English. The letters e, a, o, s, r, n, i, d, c, t, u, m are the most common letters in Spanish; e, n, i, s, r, a, t, d, h, u, l are most common for German. These same letters are extremely common in, for example, Portuguese, Bahasa Indonesian, Tagalog, French and Vietnamese.

Figure 3:
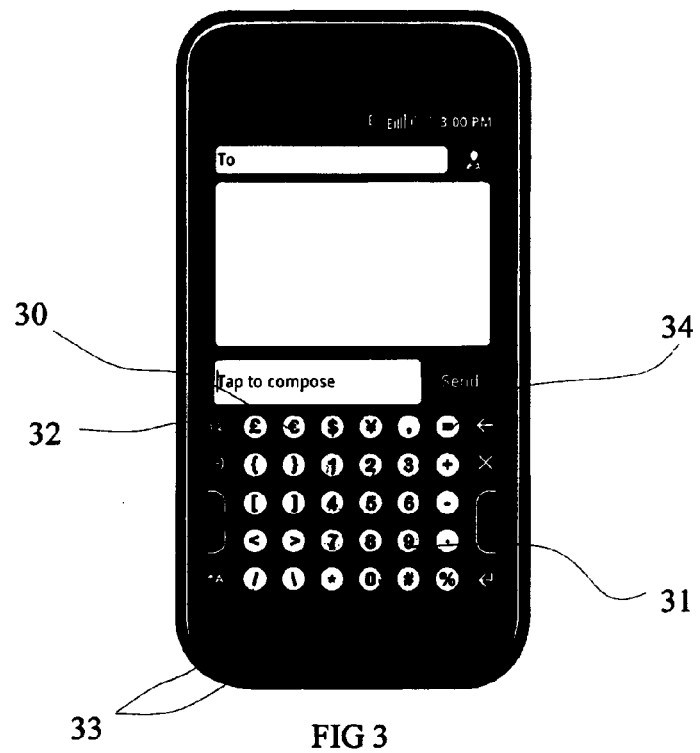
FIG. 3 shows an alternate numeric keypad layout.

As shown in FIG. 3, the same basic column layout is also suitable for numeric and special purpose character sets. In FIG. 3 there is shown a math/numeric keypad 30 featuring a standard block of the 0-9 numeric keys 31, a currency symbol row 32, two columns of brackets 33 and a math operators column 34. In a preferred embodiment the numeric keys are distinctively coloured.

It will be appreciated that other collections of keys can be arranged on a similar grid pattern.

Figure 4:
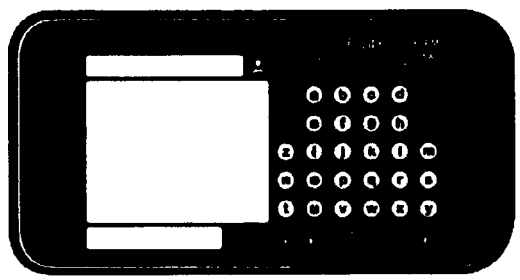
FIG. 4 shows a keypad layout suitable for right-handed typing with the device in horizontal mode.
Figure 5:
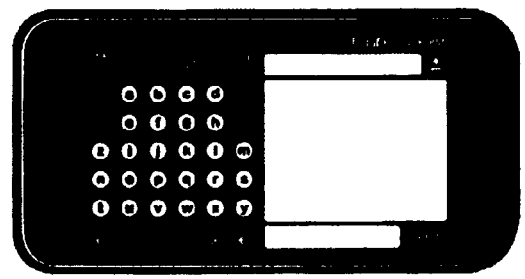
FIG. 5 shows a keypad layout suitable for left-handed typing with the device in horizontal mode.
Figure 6:
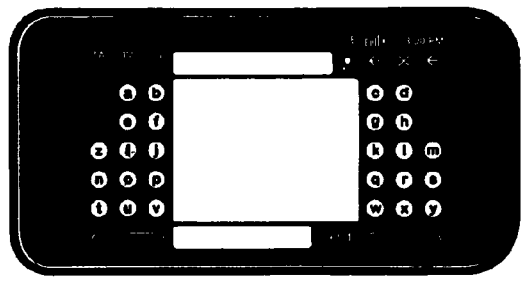
FIG. 6 shows a keypad layout suitable for 2-thumbed typing with the device in horizontal mode

It will also be appreciated that the keypad is not limited to the vertical arrangement depicted in FIG. 1. The keypad can also be deployed for horizontally oriented devices. The keypad may be deployed in several ways:

a) to the right of the screen as shown in FIG. 4;

b) to the left of the screen as deployed in FIG. 5; or c) as a split keypad with the screen in the middle as deployed in FIG. 6.

Figure 7:
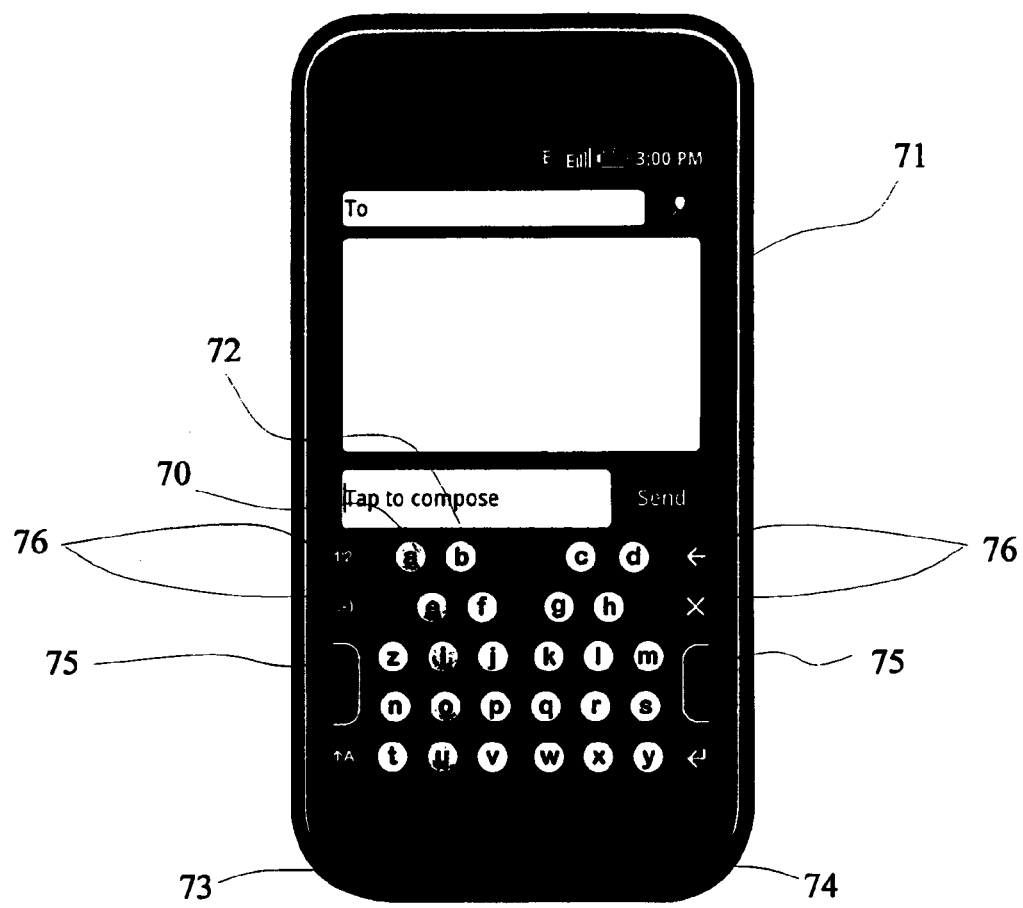
FIG. 7 shows an enhanced keypad layout for 2-thumbed typing, based on the layout in FIG. 1.

In another preferred embodiment shown in FIG. 7, the columns are curved to better match the strike zone to the rotation of the thumb when thumb-typing. The keypad is also separated into two halves to further suit typing by the user's thumbs as they hold the device. The keys are round or oval to minimise overlap of the thumb onto adjacent keys.

Referring to FIG. 7, there is shown a layout of keys in a keypad 70 of a smart phone 71. The letters 72 are arranged in the same unique alphabetic sequence described above but the columns are curved to particularly suit typing with two thumbs. The columns are separated into a left block 73 and a right block 74 to further enhance the logical arrangement of keys. In addition to the alphabet keys other function keys are provided. For instance, the keypad has two space keys 75, one for each thumb. There is also space for six function keys 76, three on each side. These keys may include a shift key to switch between upper case and lower case, a numberpad toggle key to activate the math/numeric keypad, an enter key and a backspace key as on a standard keypad. These are just examples and the function keys are not limited to any specific function.

Figure 8:
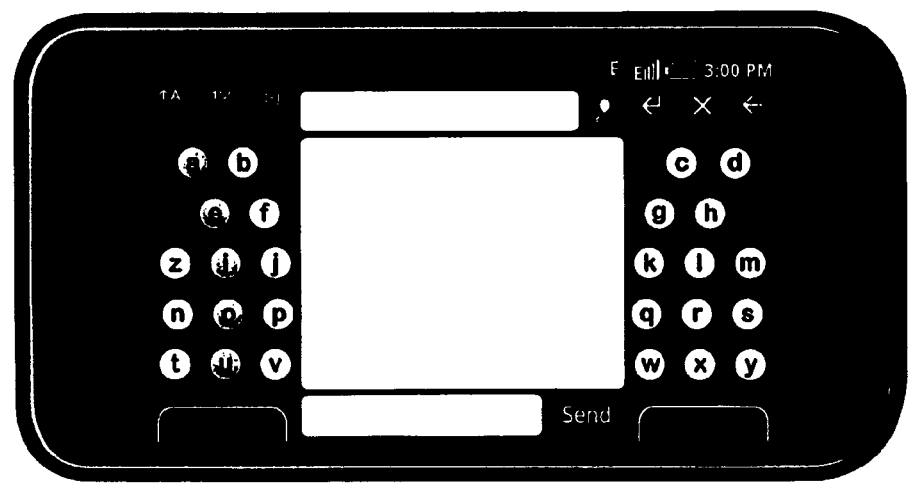
FIG. 8 shows the key layout of FIG. 6 in an alternate form, with a split keypad (for two-thumbed typing) in horizontal mode.

As shown in FIG. 8, the keypad is well suited to either portrait or landscape use. The separation of the keypad into symmetric halves leaves a work space in the middle with the keys remaining in optimal a thumb-reach and the strike zones mentioned in FIG. 2 intact.

Figure 9:
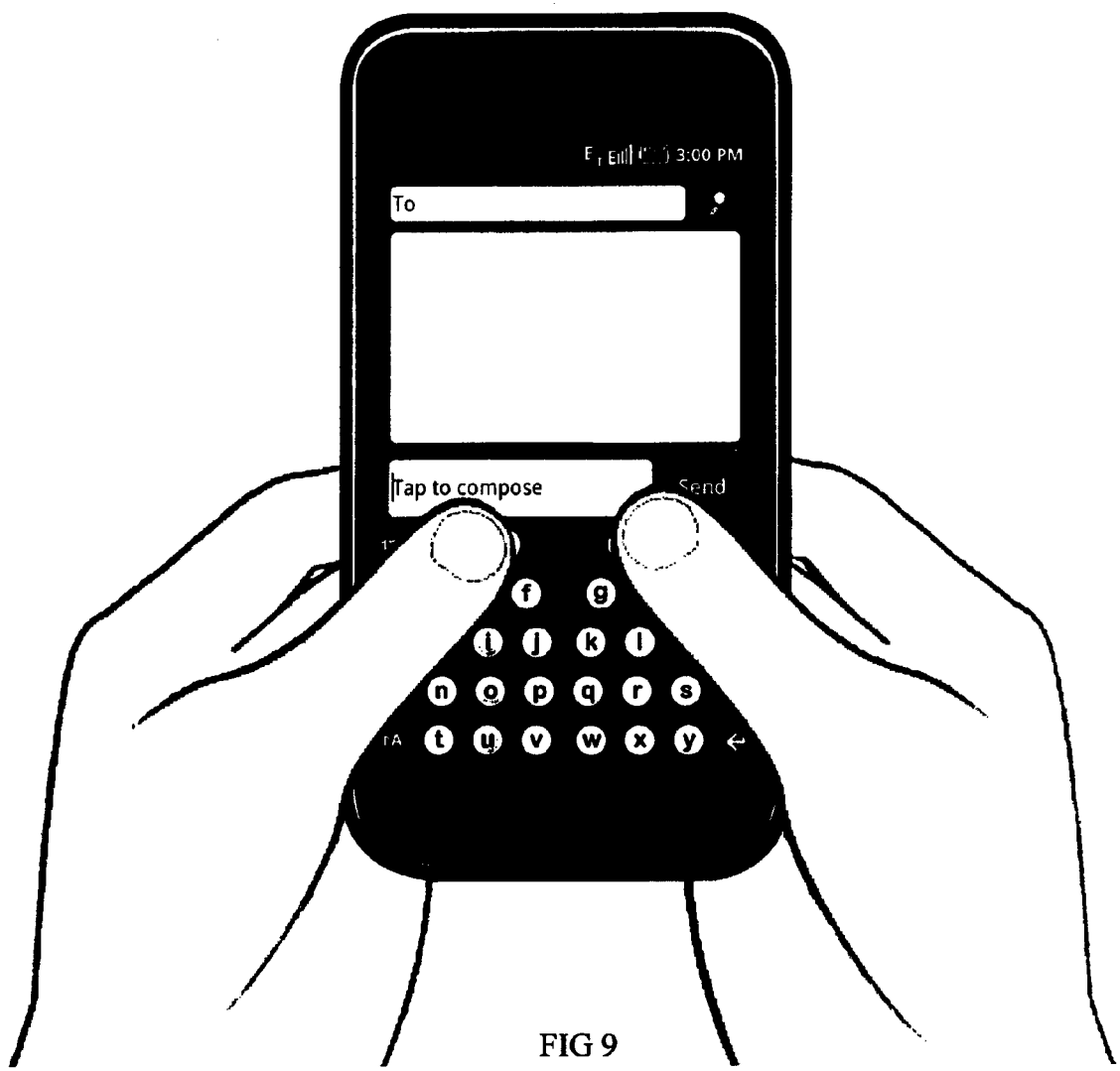
FIG. 9 depicts typing with two thumbs.

Referring to FIG. 9, the efficacy of the key layout for thumb typing is clear. The curve of the key columns maps the rotation of the thumb joint. The column of vowels a-e-i-o-u is directly below the left thumb and curved to follow the thumb rotation. Adjacent to the vowel column is a column of consonants, b-f-j-p-v, easily reachable with a slight extension of the thumb. A minor bend and rotation of the thumb is required to access z-n-t. The right thumb accesses the letters d-h-l-r-x in a symmetric location to the vowel column and the letters c-g-k-q-w by easy extension. The letters m-s-y require a minor bend and rotation of the right thumb. The function keys on each side are also easily accessible by a slight bend and rotation of either thumb.

The speed and accuracy of thumb typing is enhanced by arranging the keys, particularly the vowels and commonly used consonants, in a strike zone beneath each thumb.

Figure 10:
FIG. 10 shows an alternate right thumb keypad layout.

The keypad may be adjusted to suit the typing behaviour of individual users without affecting the efficacy of the unique alphabetic arrangement in columns under the strike zone of the typing digit. For instance, a person who types only with their right thumb would find the preferred embodiment in FIG. 10 particularly intuitive. In the embodiment of FIG. 10 the keys are arranged in columns with the unique alphabetic sequence. The columns are curved in one direction so as to closely follow the rotation of the right thumb as it rotates over the keys but without a separate left and right block.

Figure 11:
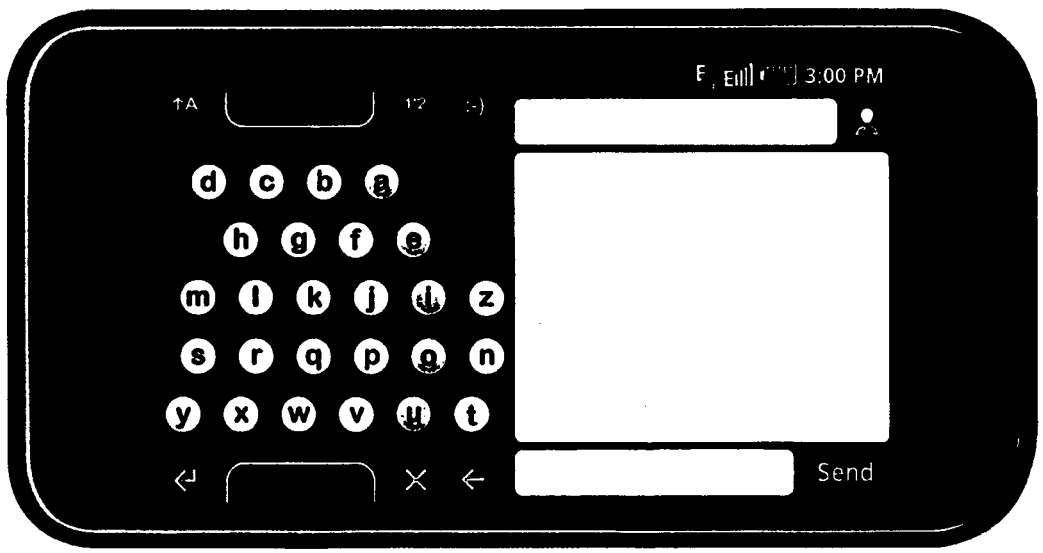
FIG. 11 shows an alternate left thumb keypad layout (in horizontal mode)

In similar manner, a person who types only with their left thumb would find the preferred embodiment of FIG. 11 most useful. In the embodiment of FIG. 11 the keys are arranged in the same columns with the unique alphabetic sequence but the columns are curved so as to closely follow the rotation of the left thumb as it rotates over the keys, again without the space. Note, that in this arrangement, the alphabetical order runs left-to-right an almost mirror image of the right-handed orientation in FIG. 10.

As can be seen by a comparison of FIG. 9 and FIG. 10, the change in orientation between portrait and landscape does not affect the core layout of the keypad.

Figure 12:
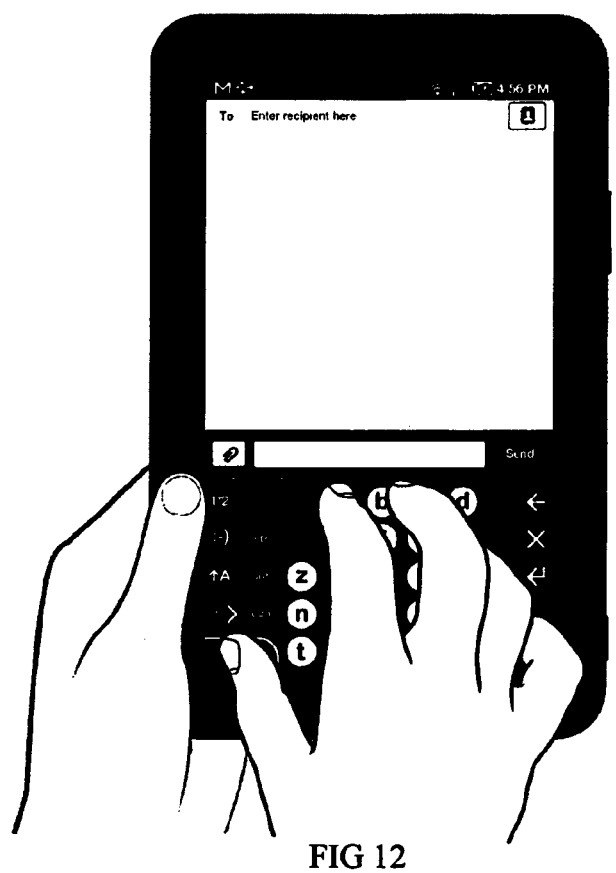
FIG. 12 shows a keypad layout for a tablet computing device, depicting one-handed typing.
Figure 13:
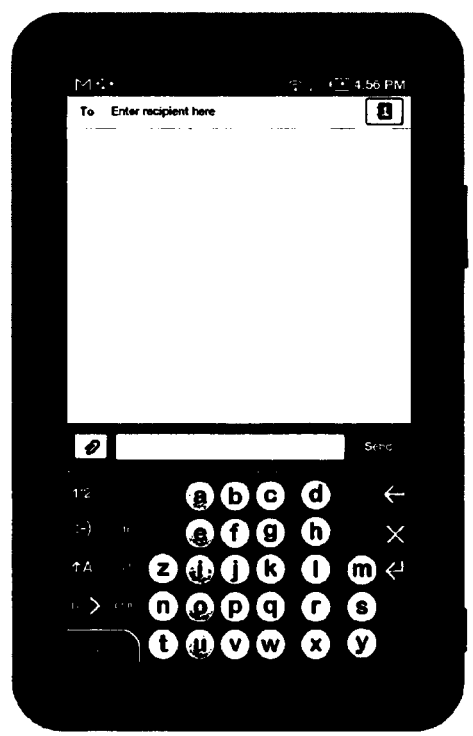
FIG. 13 shows an enhanced keypad layout similar to FIG. 11, with key columns spaced.
Figure 14:
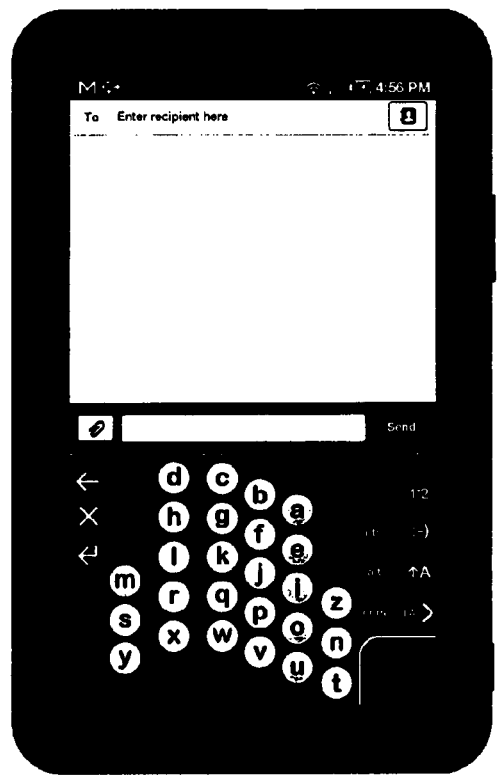
FIG. 14 shows an alternate keypad layout similar to FIG. 11, for left-handed one-handed typing.

The invention is not limited to thumb-typing. The same keypad layout with the alphabetic sequence and distinct vowel column is also useful for one-handed typing such as is often required with mobile nature of tablet computing devices. As depicted in FIG. 12, the tablet may be held in one hand while a user types with the other hand. As shown in FIG. 13, the spacing of the columns can be adjusted to further enhance the typing convenience and ergonomic factors dictated by the dimensions of human hand. It is anticipated that a user typing on the keypad of FIG. 13 would use their index finger for the column of vowels and the adjacent 'b' column. The middle finger would be used for the 'c' column, the ring finger for the 'd' column and the pinkie for the 'm' column. The 'd' and 'm' columns are spaced slightly further apart to be more ergonomically suitable. The 'z' column and function keys on the left are struck by the thumb. In addition, the columns may optionally be staggered to further enhance the ergonomic match, as seen in FIG. 14.

Figure 15:
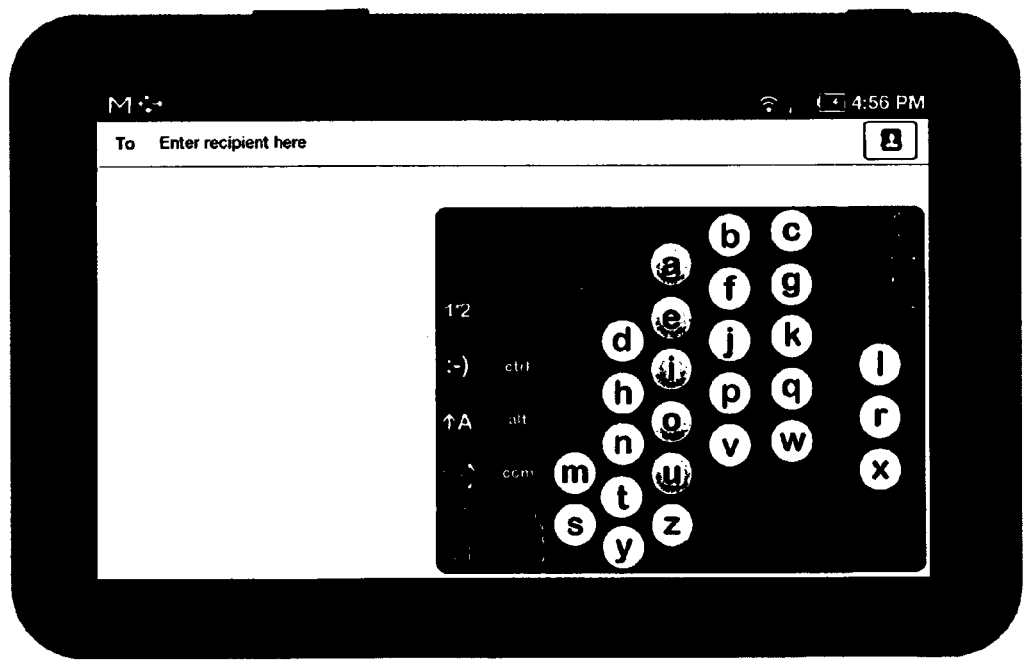
FIG. 15 shows another alternate keypad layout similar to FIG. 11, for right-handed one-handed typing.

Other variations to the embodiments described above may be conceived without departing from the principals explained by reference to the embodiments. For instance, the key layout may be mirrored for left-hand typing as shown in FIG. 14 or the curve of some of the columns may be accentuated for more extreme hand dimensions, as shown in FIG. 15. Individual columns may be wrapped such that the alphabetic order is maintained but columns are repositioned.

Figure 16:
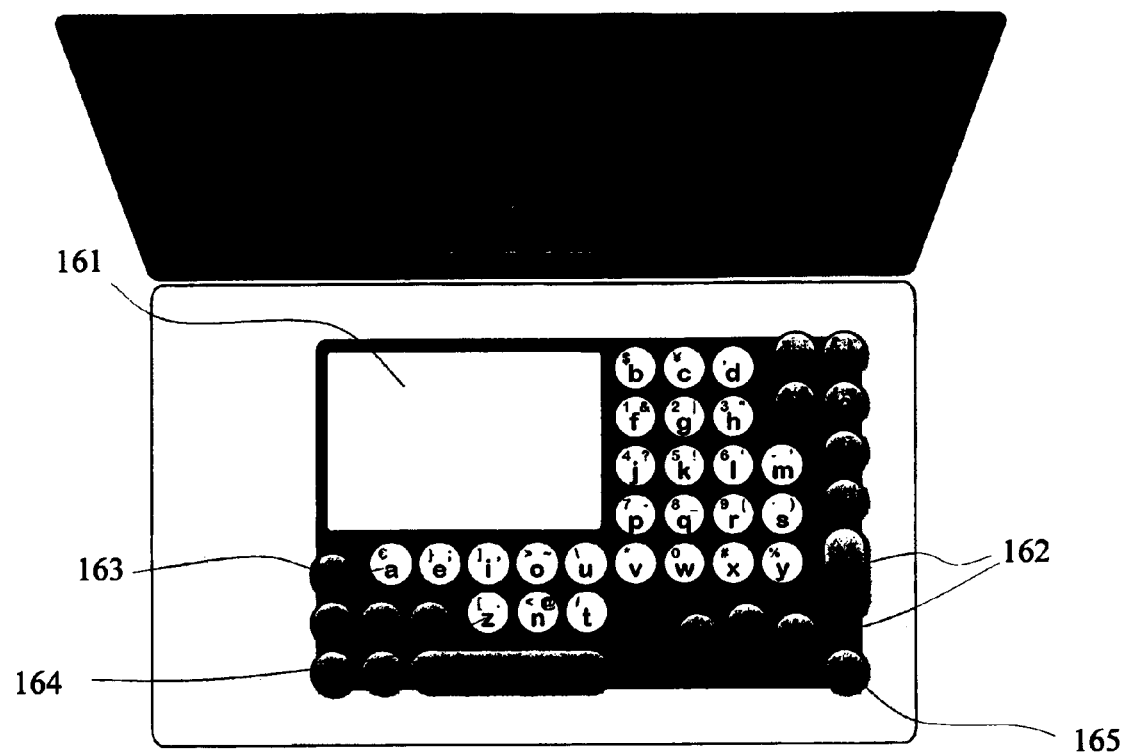
FIG. 16 shows another physical keypad layout of the invention as used on a laptop computer.
Figure 17:
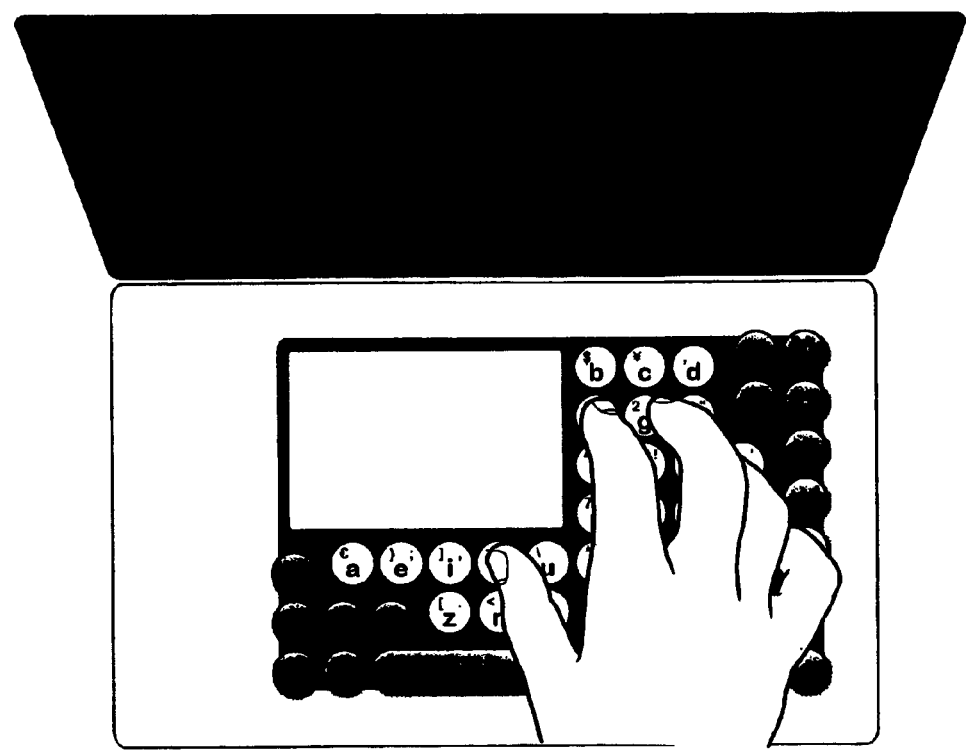
FIG. 17 shows the keypad as in FIG. 16, with a user using one-handed typing.

Still other variations to the embodiments described above may be conceived without departing from the principals explained by reference to the embodiments. For instance, the keypad is not limited to virtual, on-screen keypads. A keypad of the invention may be used as a physical, manufactured keypad for desktop computers and laptop computers as shown in FIG. 16. In this instance, the keypad integrates a touchpad 161, re-positions various function keys, retains two spacebars 162, and rotates 90 degrees anti-clockwise the entire a-e-i-o-u column 163 to a row, and the z-n-t column 164 to a row so that they can be struck with the right hand thumb, as shown in FIG. 17. It also incorporates a set of up-down-left-right arrow keys 165.

Figure 18:
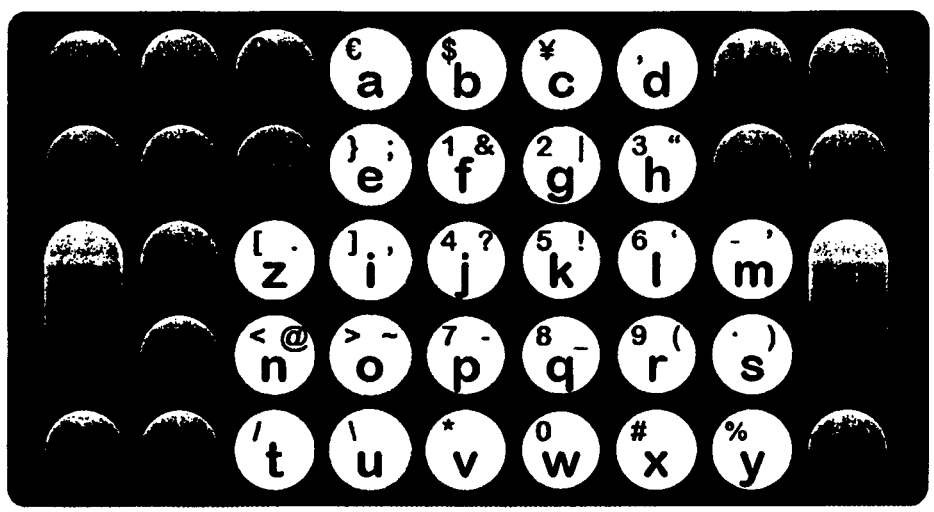
FIG. 18 shows another alternate keypad layout of a physical keypad as it may appear in the form of a smartphone-sized wireless keypad.
Figure 19:
FIG. 19 shows the keypad of FIG. 18 in elevation.

In a more compact physical format, the keypad can adapt to a smaller size such as that of a physical smartphone cover as shown in FIG. 18. In this instance, the same key layout may be used as depicted FIG. 1 for alphabetic keys, and as in FIG. 3 for numerical keys. The elevational view FIG. 19 shows the curved raised surface of the keys functioning as physical buttons.

In each instance of FIGS. 16-19 the button order can be arranged as a mirror image to facilitate typing with the left hand.

The inventor also realises that the invention is not limited to the Roman alphabet. The principle of arranging the keys in curved columns beneath a thumb strike zone also applies to other alphabets, such as Cyrillic, Hebrew, Kanji, etc. It is also useful for arranging a Braille keypad for thumb typing.

Although the keypad has particular advantage for single finger and thumb typing, the inventor also considers the arrangement of keys is more intuitive than the QWERTY keypad as the keys are arranged in alphabetic order, but for the 'z' key, and could therefore also be applied to physical keyboards and keypads, as the disadvantages inherent in mechanical typewriters are no longer relevant to modern keyboards and keypads.

Figure 20:
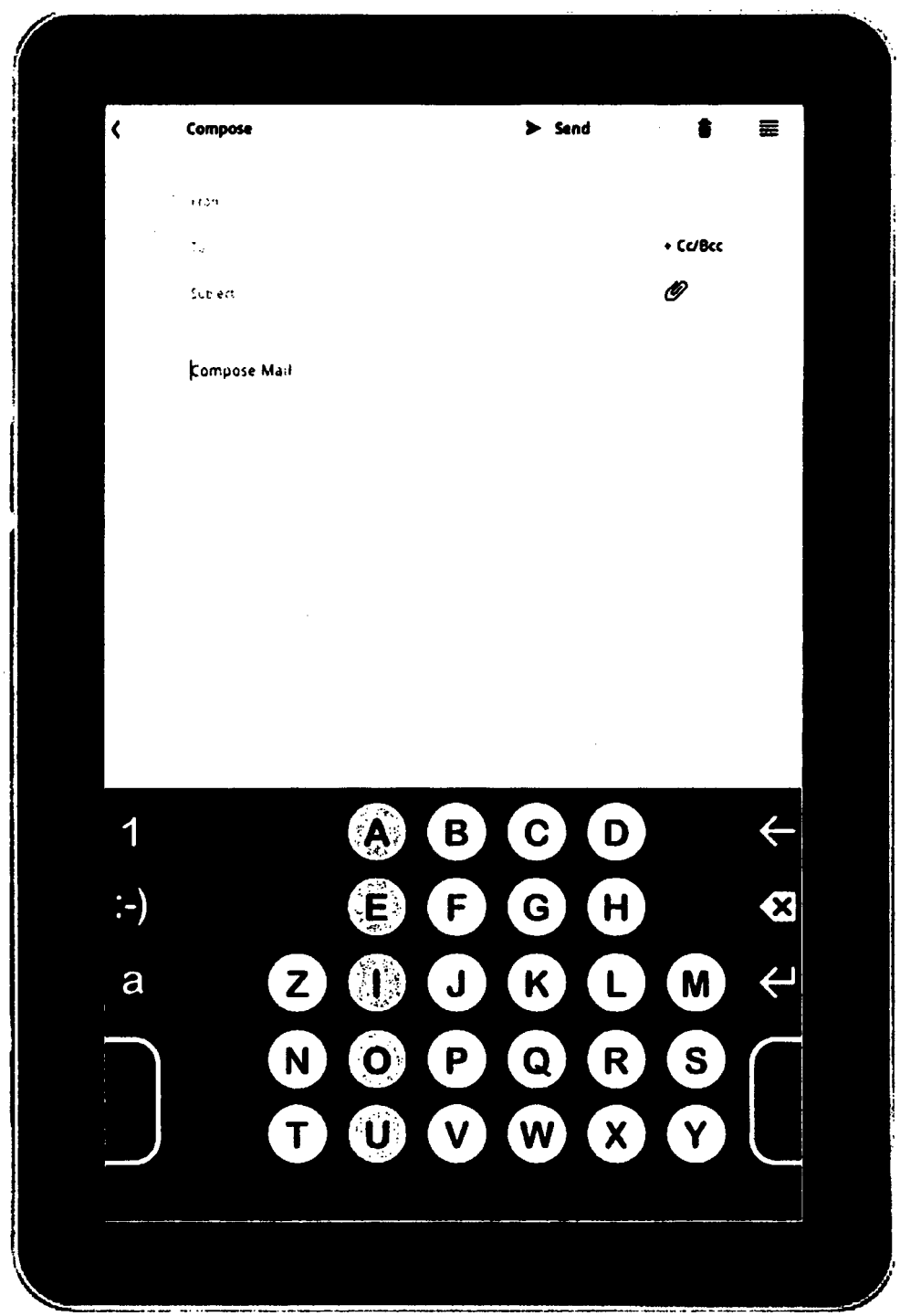
FIG. 20 shows a preferred keypad layout of the invention as it may appear on a mobile computing device.
Figure 21:
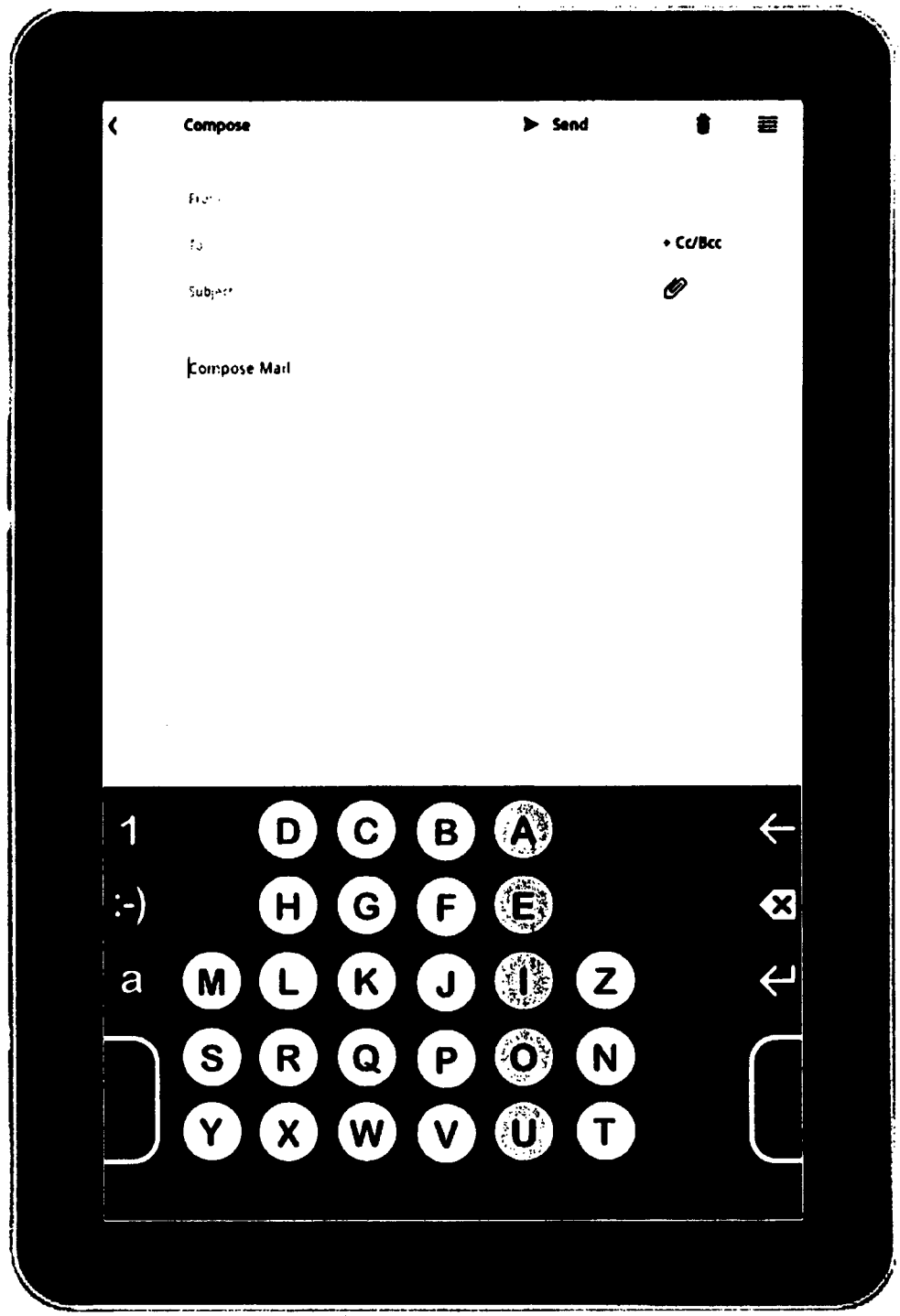
FIG. 21 shows an alternative keypad layout of the invention, with left hand bias, as it may appear on a mobile computing device.
Figure 22:
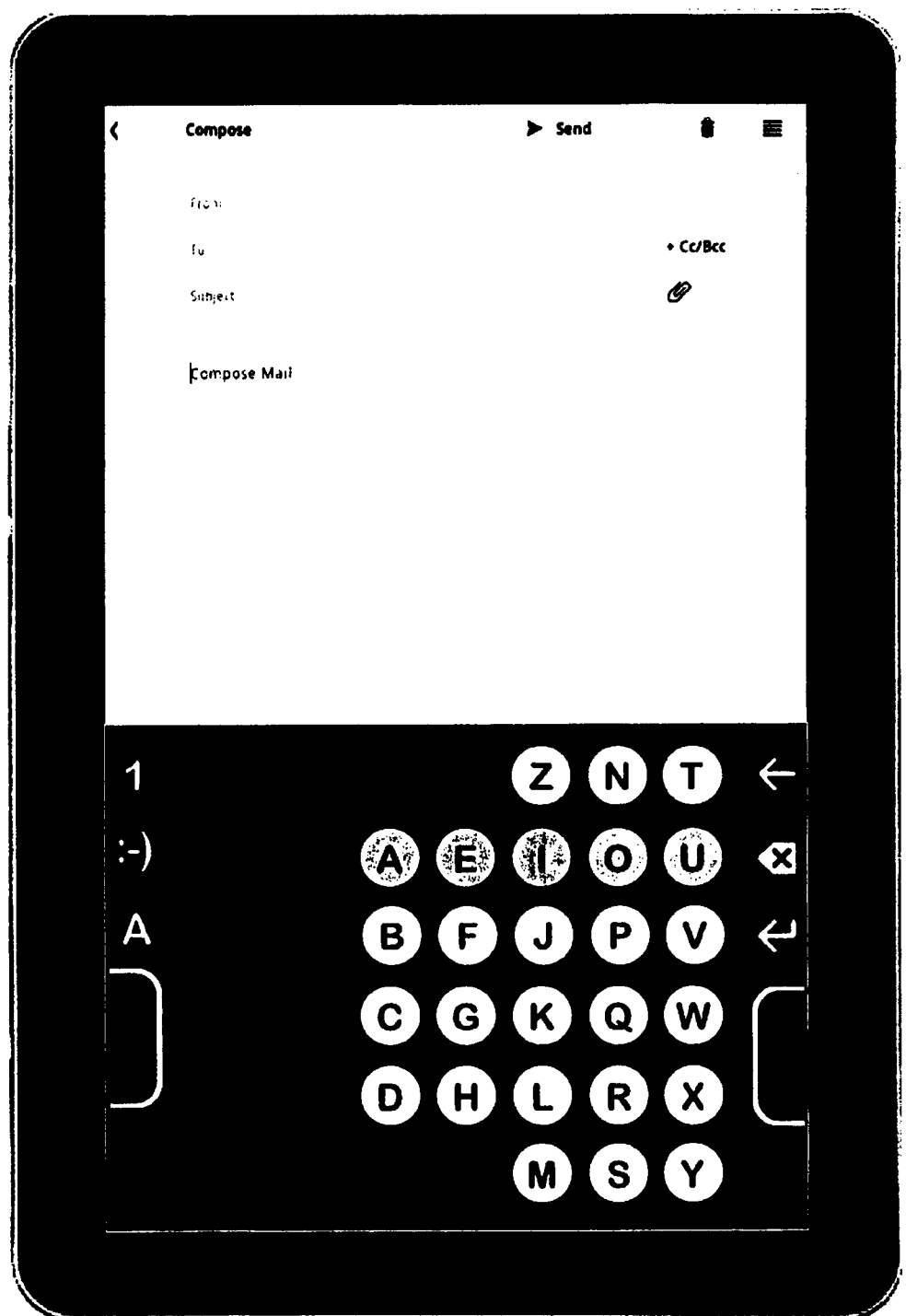
FIG. 22 shows an alternative keypad layout of the invention, with right hand bias, as it may appear on a mobile computing device.
Figure 23:
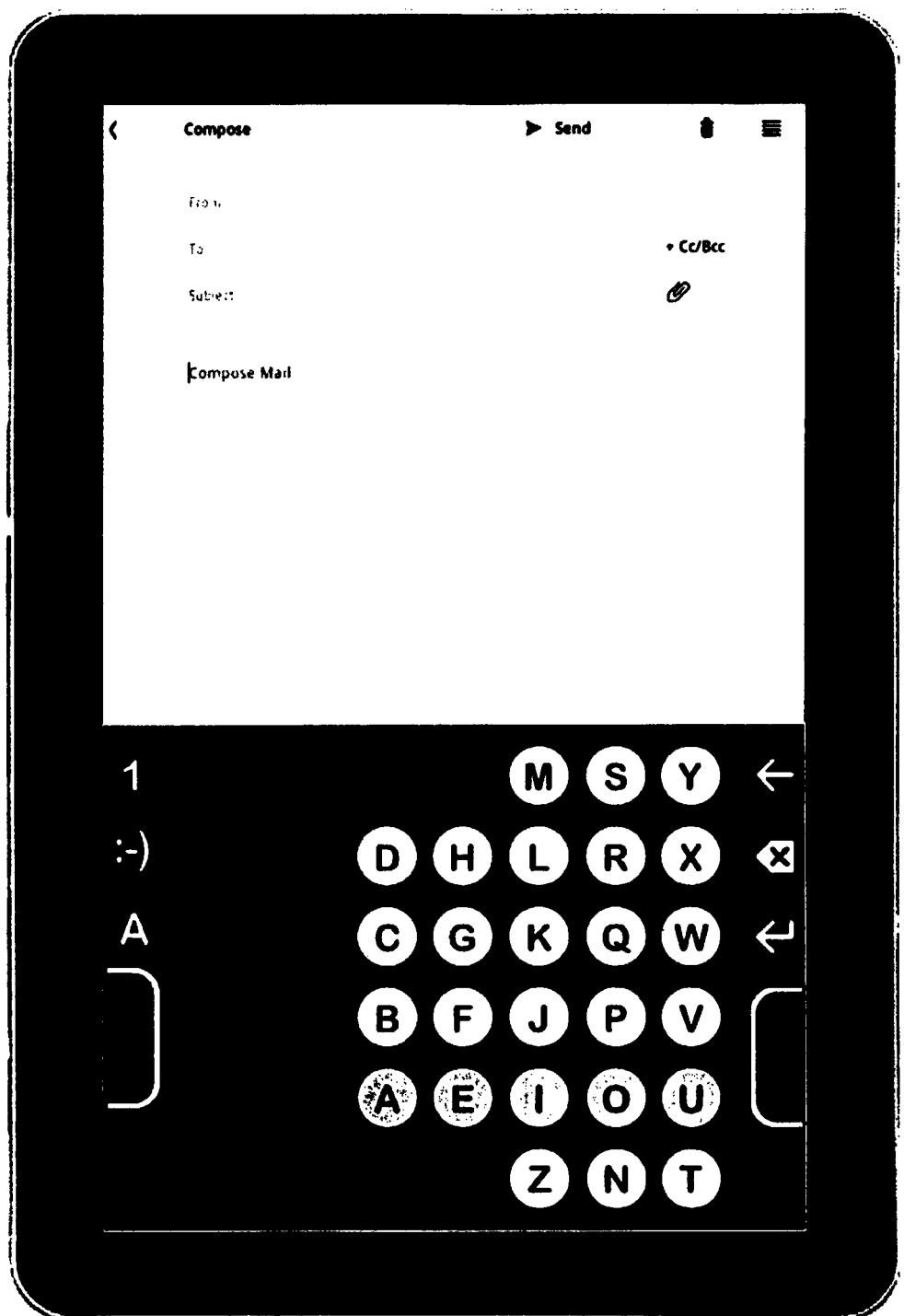
FIG. 23 shows an alternative keypad layout of the invention, with right hand bias, as it may appear on a mobile computing device.
Figure 24:
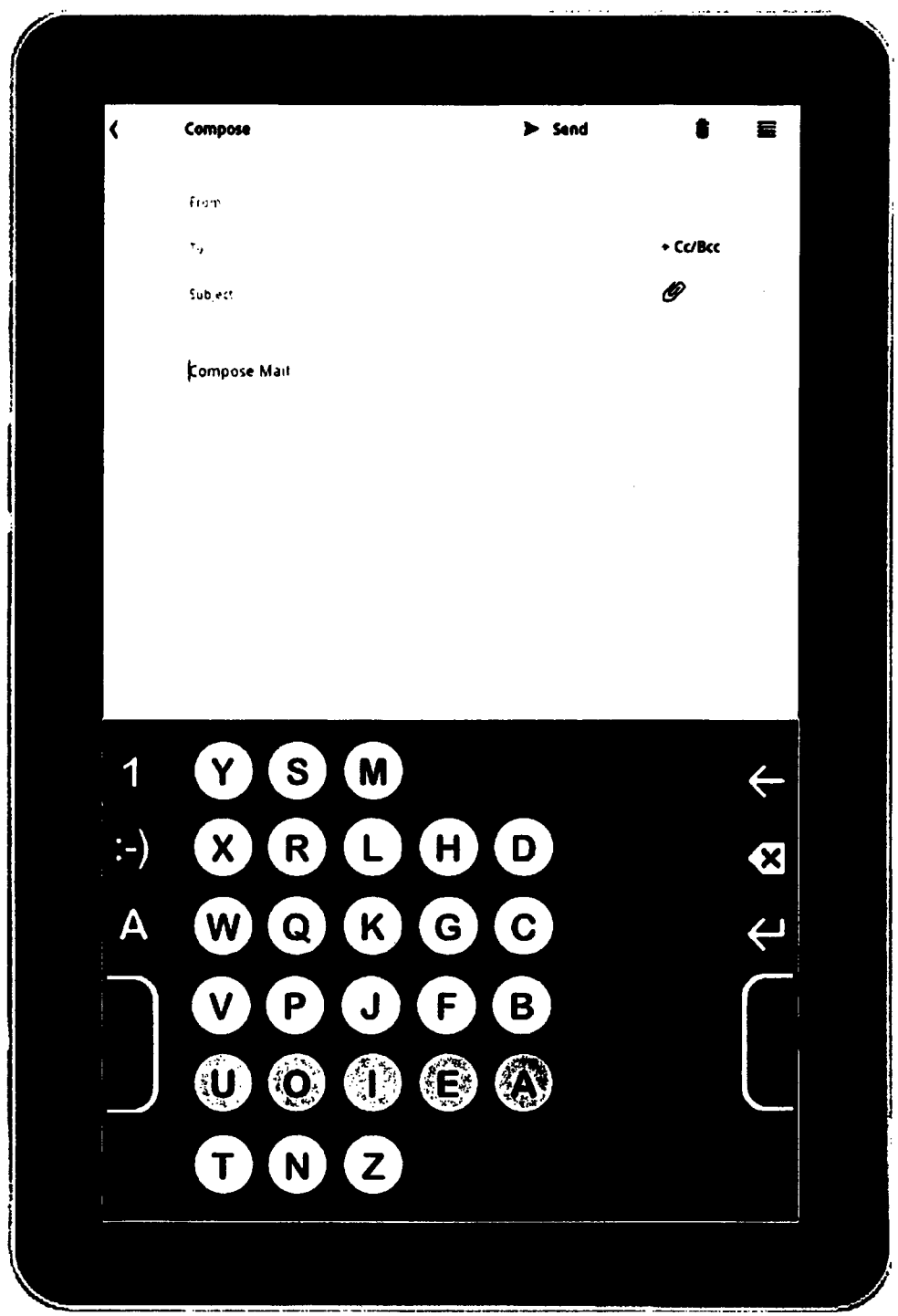
FIG. 24 shows an alternative keypad layout of the invention, with left hand bias, as it may appear on a mobile computing device.

FIGS. 20-25 illustrate use of the keypad of the invention with a electronic information display terminal such as an IPAD®. FIG. 20 shows the vowel keys as a column and the key alphabetical progression left to right and top to bottom. FIG. 21 shows the same key arrangement but with alphabetical progression from right to left.

Figure 25:
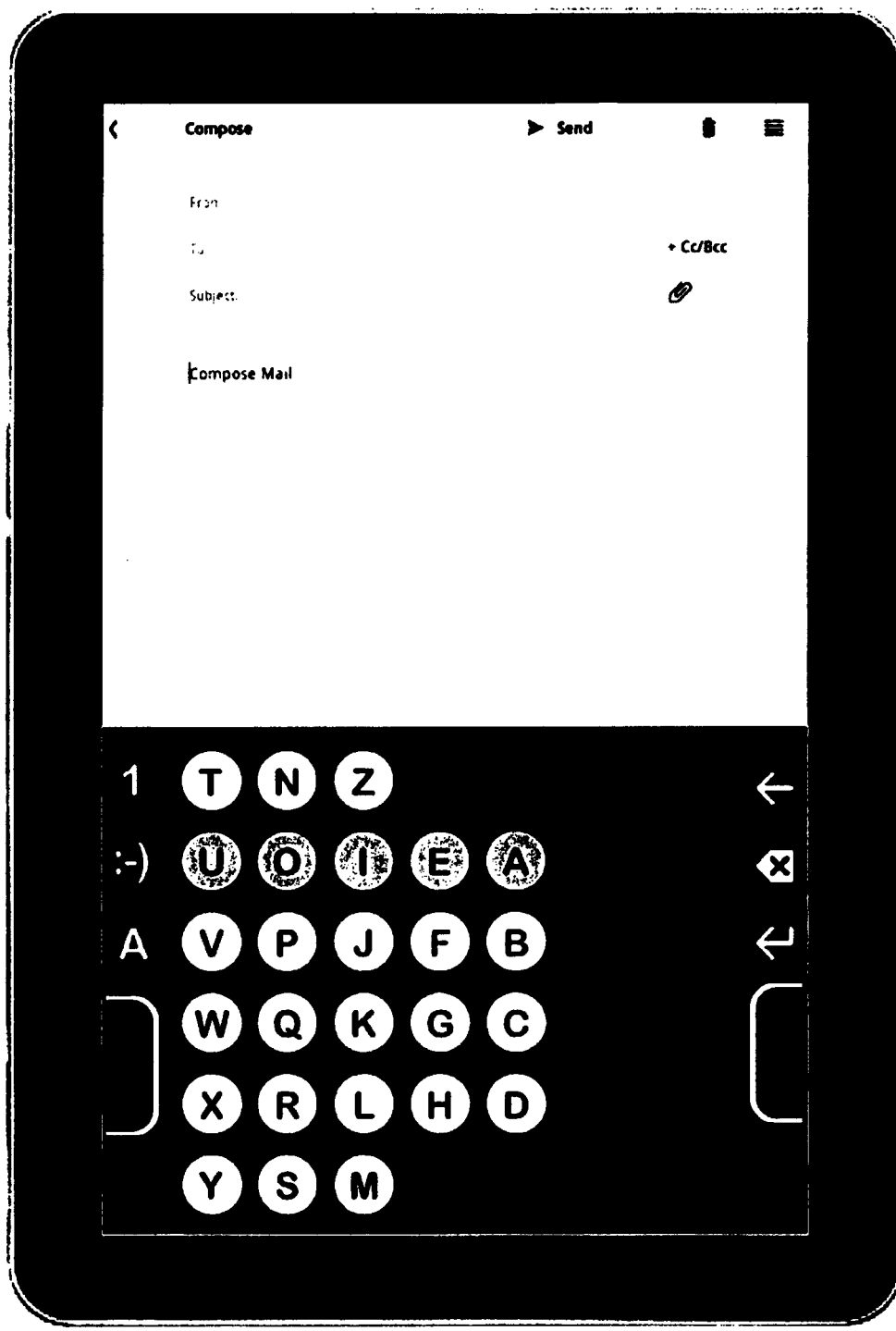
FIG. 25 shows an alternative keypad layout of the invention, with left hand bias, as it may appear on a mobile computing device.

FIGS. 22-25 show the vowel keys as a row, with alphabetical progression from top to bottom and left to right (FIG. 22); bottom to top and left to right (FIG. 23); bottom to top and right to left (FIG. 24); and top to bottom and right to left (FIG. 25).

Figure 26:
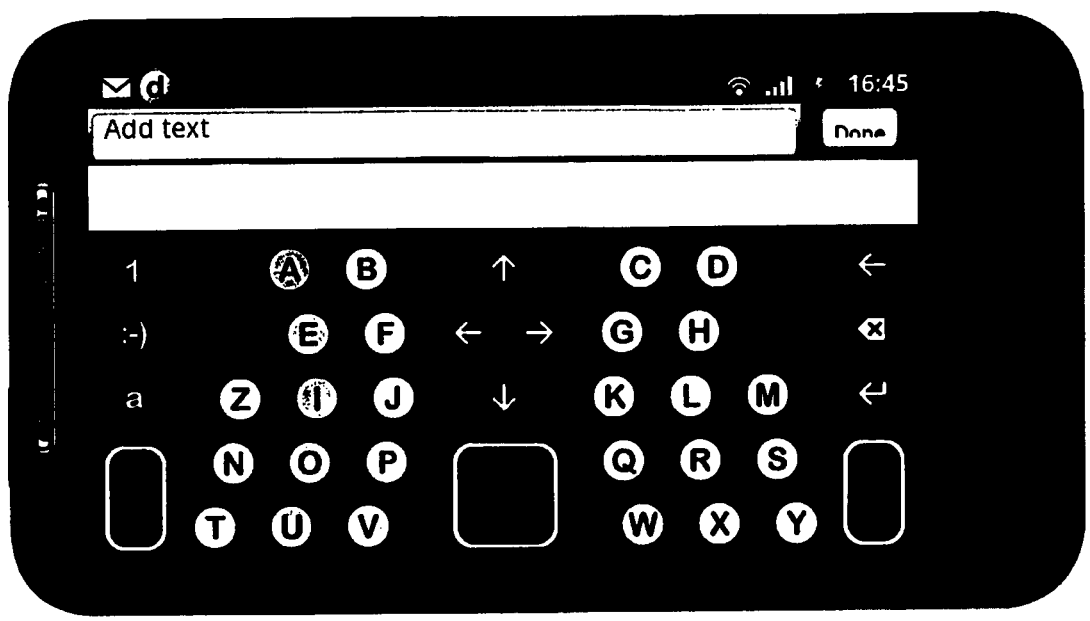
FIG. 26 shows a keypad layout of the invention in an alternative form, with a split keypad (for two-thumbed typing) in horizontal mode.

As shown in FIG. 26, the split keypad can include function keys between the letter keys, in this case directional keys.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A keypad comprising at least consonant keys and vowel keys of the alphabet from A-Z such that all the vowel keys are arranged in a single column separate from and between two edge columns containing consonant keys, or in a single row separate from and between two edge rows containing consonant keys, wherein the vowel keys and the consonant keys, other than Z, follow a sequential alphabetic progression from A to Y along adjacent keys of sequentially adjacent rows or columns, and wherein Z is positioned out of the sequential alphabetic progression and next to a key other than Y.

2. The keypad of claim 1, wherein the vowel keys and the consonant keys are arranged in six columns or rows.

3. The keypad of claim 1, wherein the vowel column/row is a second column/row.

4. The keypad of claim 3, wherein the columns map to a human hand with the first column adapted for contact by the thumb, the second and third column adapted for contact by the index finger, the fourth column adapted for contact by the middle finger, the fifth column adapted for contact by the ring finger, and the sixth column adapted for contact by the pinky finger.

5. The keypad of claim 1, comprising a spacing between the columns/rows such that some of the columns/rows are on one side of the spacing and other of the columns/rows are on the other side of the spacing.

6. The keypad of claim 5, wherein the columns on one side of the spacing comprise the letter ABEFZIJNOPTUV, and the columns on the other side of the spacing comprise the letters CDGHKLMQRSWXY.

7. The keypad of claim 2, wherein the first column/row comprises the letters ZNT, the second column/row comprises the letters AEIOU, the third column/row comprises the letters BFJPV, the fourth column/row comprises the letters CGKQW, the fifth column/row comprises the letters DHLRX, and the sixth column/row comprises the letters MSY.

8. The keypad of claim 1 wherein the keys are arranged in a right side block of columns beneath a strike zone of a right thumb of a user and a left side block of columns beneath a strike zone of a left thumb of a user.

9. The keypad of claim 8 wherein the columns are curved.

10. The keypad of claim 8 wherein the right side block of columns is separated from the left side block of columns.

11. The keypad of claim 10 wherein the right side block of columns is separated from the left side block of columns by a screen.

12. The keypad of claim 10 wherein the right side block of rows is separated from the left side block of rows by a screen.

13. The keypad of claim 9 wherein the rows are curved.

14. The keypad of claim 9 wherein the right side block of rows is separated from the left side block of rows.

15. The keypad of claim 9 wherein the curvature approximates the angle of rotation of a human thumb.

16. The keypad of claim 8 wherein the keys are arranged in a right side block of rows beneath a strike zone of a right thumb of a user and a left side block of rows beneath a strike zone of a left thumb of a user.

17. The keypad of claim 1 wherein the consonant and vowel keys are interchangeable with mathematical symbol and numerical keys.

18. The keypad of claim 1 wherein the keys are arranged in a 6×5 grid.

* * * * *